United States Patent [15] 3,689,589
Reusser [45] Sept. 5, 1972

[54] DISPROPORTIONATION-DIMERIZATION OF ETHYLENE

[72] Inventor: Robert E. Reusser, Bartlesville, Okla.

[73] Assignee: Phillips Petroleum Company,

[22] Filed: Aug. 11, 1969

[21] Appl. No.: 849,184

[52] U.S. Cl...........260/683.15 R, 252/437, 252/458, 260/683 D
[51] Int. Cl..............................C07c 3/20, C07c 3/62
[58] Field of Search......................260/683.15, 683 D

[56] References Cited

UNITED STATES PATENTS

| | | | |
|---|---|---|---|
| 2,381,198 | 8/1945 | Bailey et al. | 260/683.15 |
| 2,825,721 | 3/1958 | Hogan et al. | 260/683.15 X |
| 3,261,879 | 7/1966 | Banks | 260/683.15 X |
| 3,330,882 | 7/1967 | Albright | 260/683 |
| 3,335,199 | 8/1967 | Griffin et al. | 260/683.15 |
| 3,395,196 | 7/1968 | Heckelsberg | 260/683 |
| 3,526,676 | 9/1970 | Turner et al. | 260/683 |
| 2,581,228 | 1/1952 | Bailey et al. | 260/683.15 |
| 3,341,620 | 9/1967 | Clark et al. | 260/683.15 |
| 3,431,316 | 3/1969 | Banks | 260/683 |
| 3,463,827 | 8/1969 | Banks | 260/683 X |

Primary Examiner—Paul M. Coughlan, Jr.
Attorney—Young and Quigg

[57] ABSTRACT

Ethylene is upgraded to hydrocarbons of higher molecular weight by contact with a catalyst comprising an olefin dimerization component and an olefin disproportionation component.

11 Claims, No Drawings

DISPROPORTIONATION-DIMERIZATION OF ETHYLENE

FIELD OF THE INVENTION

This invention relates to a method of converting olefins to other olefins of higher molecular weight. Furthermore, the invention relates to a method of converting ethylene to higher molecular weight olefins by contact with a suitable catalyst system. In a further aspect, this invention relates to the conversion of ethylene by contact with a catalyst which comprises an olefin dimerization component and an olefin disproportionation component.

DESCRIPTION OF THE PRIOR ART

It has recently been found that certain catalyst systems are active for the disproportionation of olefins to other olefins of both higher and lower molecular weight. By "disproportionation of olefins" within the specification and claims it is meant the reaction of olefins to produce other olefins having both higher and lower molecular weight. Alumina promoted by molybdenum oxide disproportionates propylene to substantial quantities of both ethylene and butenes as disclosed in U.S. Pat. No. 3,261,879, filed Sept. 27, 1963, issued July 19, 1966, to R. L. Banks. The term "disproportionation of olefins" also includes the reaction of mixtures of olefins to produce olefin products, all of which have a higher molecular weight than one member of the mixture of the starting materials. For example, alumina promoted by an oxide of molybdenum will disproportionate a mixture of propylene and hexene-3 to a mixture comprising substantial quantities of butenes and pentenes. Additionally, it is known that certain catalyst systems are capable of effective dimerization of olefins. For example, a composition containing certain transition metals can function as a catalyst to produce dimers of various olefins. By "dimerization" in the specification and claims, it is meant the reaction of olefins to produce dimers thereof or other oligomers wherein the number of carbon atoms per molecule in the produce compounds is a multiple of the number of carbon atoms in the starting material. For example, butenes, hexenes, octenes, etc. are considered dimers and oligomers of ethylene; while propylene, pentenes, heptenes, etc. are not products of dimerization.

SUMMARY OF THE INVENTION

According to my invention, ethylene is converted to heavier molecular weight olefin products, which include a substantial quantity of product olefins which are not multiples of ethylene, by contacting ethylene with one of two suitable catalyst systems. A first catalyst system comprises a physical mixture of a solid dimerization catalyst and a solid disproportionation catalyst. The dimerization catalyst and the disproportionation catalyst are also referred to as the dimerization component and disproportionation component of the first catalyst system. The second catalyst system comprises a suitable solid support material copromoted with a dimerization promoter and a disproportionation promoter.

DETAILED DESCRIPTION OF THE INVENTION

The products of the process of the invention are acyclic olefins having a distribution of carbon atom numbers which includes olefins having carbon atoms numbers which are not multiples of ethylene. Thus, propylene, pentene, heptene, etc., are found in the reaction product in more than trace quantities, i.e., in excess of 1 weight percent based on the total weight hydrocarbon product. The olefin products can be both branched and unbranched, terminal or internal.

In the first catalyst system of the invention employing a physical mixture of two separate catalytic components, the olefin dimerization component of that system is nickel oxide associated with a suitable support material. The presently preferred support materials are silica, silica-alumina, and alumina. The most preferred dimerization component is silica-alumina promoted by an oxide of nickel. Mixtures of combinations of supports and promoters can be used. For example, a mixture of nickel oxide on silica and nickel oxide on silica-alumina can be used as a dimerization component of the catalyst system. The supported nickel oxide composition generally contains from about 0.1 to about 15 weight percent nickel oxide based on the total composition. Such catalysts are conventional and their preparation is known in the art.

The solid olefin disproportionation component in the first catalyst system using the physical mixture of the two components selected from (1) silica or thoria promoted by an oxide, or a compound convertible to an oxide by calcination of tungsten or molybdenum; (2) alumina promoted by an oxide, or by a compound convertible to an oxide, by calcination of molybdenum or tungsten, or promoted by an alkali metal salt, alkaline earth metal salt, or bismuth salt of phosphomolybdic acid; (3) one or more of the group aluminum phosphate, titanium phosphate, zirconium phosphate, calcium phosphate, or magnesium phosphate, promoted by one or more of an oxide, or a compound convertible to an oxide by calcination, of molybdenum, tungsten, or promoted by magnesium tungstate or beryllium phosphotungstate; or (4) silica, alumina, aluminum phosphate, zirconium phosphate, calcium phosphate, magnesium phosphate, or titanium phosphate promoted by rhenium oxide or by a hexacarbonyl of molybdenum, tungsten, or rhenium. These catalysts generally contain from about 0.1 to about 30 weight percent of the promoter material based on the total catalytic composition.

The catalysts of (1) can be prepared and activated by conventional techniques such as by combining a catalyst grade silica with suitable tungsten or molybdenum compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air at temperatures of from about 600°–1,500°F for a period of 1 second to 25 hours or more, shorter times being used with higher temperatures, longer times with lower temperatures.

The catalysts of (2) can be prepared and activated by conventional techniques such as by combining catalyst grade alumina with an oxide, or compound convertible to an oxide by calcination, of molybdenum or tungsten and calcining the resulting mixture under conditions similar to group (1) above after removal of any solvent used in the impregnation. The salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air under conditions similar to group (1) above to produce an activated catalyst. Alternatively, the support material, such as zirconia, can be impregnated with a compound promoter convertible to the oxide, such as ammonium tungstate, followed by calcination in air.

The catalyst compositions of (4) can be prepared and activated by impregnating a previously calcined support material such as calcium phosphate with a solution of the hexacarbonyl of the promoter in an organic solvent such as benzene, followed by drying in a vacuum in an inert atmosphere at about 50° to 700°F (10° to 371°C). Similarly, alumina gel can be impregnated with an aqueous solution of ammonium perrhenate, followed by drying and calcining in air at 600°–1,500° F.

The presently preferred disproportionation components of the catalyst system which are admixed with the dimerization component are (Group 1) silica promoted by an oxide of tungsten, (Group 2) alumina promoted by an oxide of molybdenum, (Group 3) aluminum phosphate promoted by an oxide of tungsten, (Group 4) alumina promoted by an oxide of rhenium an alumina promoted by a hexacarbonyl of molybdenum. The still more preferred disproportionation component, when admixed with the preferred dimerization component (nickel oxide on silica-alumina), in tungsten oxide on silica.

The proportion of olefin disproportionation component to olefin dimerization component in the catalyst mixture will range from about 0.1 to about 10 in parts by weight. The preferred catalyst mixtures are those which, for convenience and practicality, are activated and regenerable with the same procedure suitable for each individual catalyst. Thus, the preferred catalyst mixtures are those using promoters which are metal oxides and which are activated and regenerated at elevated temperatures in oxygen-containing atmospheres such as air. For example, a preferred combination is a mixture of silica-alumina-supported nickel oxide and either alumina-supported molybdenum oxide or silica-supported tungsten oxide. Following the calcination, the catalyst can, if desired, be treated with other gases such as nitrogen, CO, and the like.

To prepare the physical mixture of the components, particles of the olefin dimerization component and particles of the olefin disproportionation component, having about the same particle size, can simply be blended. In another technique, both the dimerization component and the disproportionate component can be intimately associated such as by grinding, and the powder then formed into the other shapes such as pellets, tablets, agglomerates, extrudates, and the like, such that each particle in the catalytic zone is already an intimate blend of these two catalysts.

In the second catalyst system of the present invention in which a single support is copromoted by both an olefin dimerization component and an olefin disproportionation component, the supports are selected from such materials such as silica, silica-alumina, and alumina. The catalyst system can be prepared by any conventional techniques such as dry mixing, impregnation, coprecipitation, and the like. The different components can be distributed on the support either simultaneously or consecutively. A preferred technique is to coimpregnate a suitable support with both promoters simultaneously. After the composite is prepared, it is activated by heating at temperatures up to about 1,500°F, preferably 900°–1100°F. in air for periods of 0.1 to 25 hours depending upon the specific catalyst ingredients chosen. For example, a silica-supported tungsten oxide-nickel oxide catalyst is activated at about 1,000°F for about 5 hours.

The support component of the coprepared catalyst system can be any conventional catalytic grade material and can be prepared by such techniques as gelation, coprecipitation, flame hydrolysis, aerogel formation, and the like. These materials can range from fine powders to coarse granules. The finished catalysts, prepared from such materials, can also be in the form of powders or granules, as well as in other shapes such as agglomerates, pellets, spheres, extrudates, and the like depending upon the contacting technique.

The disproportionation promoters of the coprepared catalyst are selected from the group consisting of molybdenum oxide, tungsten oxide, or rhenium oxide, or compounds convertible to these oxides by calcination. The preferred disproportionation components are molybdenum oxide and tungsten oxide. The dimerization promoters are selected from nickel oxide, or compounds convertible to nickel oxide on calcination. In general, the copromoted catalyst will contain from about 0.1 to about 30 weight percent of the disproportionation promoter and from about 0.01 to about 15 weight percent of the dimerization promoter based upon the weight of the total composite.

According to the process of the invention, ethylene is contacted with the combined catalyst systems of the present invention under conditions such that appreciable amounts of olefins which are multiples of ethylene as well as those which are nonmultiples are obtained. If desired, the ethylene feed can be diluted with inert gases or vapors such as nitrogen, paraffinic hydrocarbons, and the like. In general, the process can be carried out from about 200° to about 800°F, depending upon the specific catalyst components chosen, and at pressures of 0 to 1,500 psig. Good results have been obtained with temperatures in the range of 500° to 800°F. The process is preferably carried out continuously in the vapor phase and weight hourly space velocity in the range of 0.1 to 400 wt/wt/hr can be used. The process can utilize any conventional contacting technique such as fixed bed reactors, fluidized bed reactors, and the like.

At the completion of the reaction, the products can be separated and/or isolated by any convenient method such as by fractionation, adsorption, and the like. Unconverted ethylene can be recycled.

The invention is illustrated by the following examples.

EXAMPLE I

A 5.0 g quantity of a particulate silica-supported $NiO-WO_3$ catalyst (prepared by impregnating 25 g silica gel with a solution of 4.0 g $Ni(NO_3)_2 \cdot 6H_2O$ and 12.15 g ammonium metatungstate in 50 ml water followed by drying and calcining in flowing air at 1,000°F for 4 hours) was charged to a stainless steel fixed bed reactor. The catalyst bed was heated to 1,000°F for 3 hours, and then treated with a stream of CO for 20 minutes after which time it was cooled to 700°F. A stream of ethylene, diluted with heptane, was passed over the catalyst at 400 psig and 700°F. Over a 14-minute period, 29.3 g of ethylene was passed over the catalyst, the conversion being about 3.2 percent.

The effluent from the above-described run was collected and, although a portion of the more volatile products were inadvertently lost, the remaining portion was analyzed by gas-liquid chromatography and showed the following olefin products:

| Olefin Product | Weight Per Cent |
|---|---|
| $C_3$ | 7.2 |
| $C_4$ | 54.6 |
| $C_5$ | 4.3 |
| $C_6$ | 13.5 |
| $C_7$ | 11.2 |
| $C_8$ | 9.1 |

The data in the table above illustrate that the copromoted catalyst system of the present invention is capable of converting ethylene to other higher molecular weight olefins which are not limited to oligomers which are simply multiples of ethylene.

EXAMPLE II

A run similar to that of Example I was carried out except that the fixed catalyst bed contained a physical mixture of 3.00 g of a $WO_3-SiO_2$ (−30 + 50 mesh) catalyst, 2.00 g of a $SiO_2 \cdot Al_2O_3-NiO_2$ (about 1% Ni on about a 90:10 silica-alumina gel) catalyst, and 1.00 g of a $Ni-SiO_2$ (about 10% Ni on a flame hydrolyzed silica). The mixed catalyst bed was heated in flowing air for 3 hours at 1,000° F and in flowing CO for 20 minutes. It was then cooled to 700° F and ethylene, diluted with heptane, was passed over the catalyst. In an 11-minute period, 23 g of ethylene was passed over the catalyst, the conversion being about 10.8 percent. Although some of the collected effluent was inadvertently lost, the remaining portion was analyzed and showed the following olefin products.

| Olefin Product | Weight Per Cent |
|---|---|
| $C_3$ | 10.1 |
| $C_4$ | 68.5 |
| $C_5$ | 3.5 |
| $C_6$ | 15.2 |
| $C_8$ | 2.7 |

The data in the table above show that the physically mixed catalyst embodiment of the present invention is also capable of converting ethylene into other higher molecular weight olefin products.

EXAMPLE III

For purpose of comparison, a run similar to that of Example II was carried out except that the fixed catalyst bed contained a mixture of 2 g of the $Ni-SiO_2$ catalyst and 3 g of a $NiO_2-Al_2O_3$ catalyst (containing about 11% Ni on alumina gel). No disproportionation catalyst was present. The mixed catalyst bed was heated in flowing air for three hours at 1,000° F and flowing CO for 20 minutes. It was then cooled to 700°F. Ethylene diluted with heptane was passed over the catalyst at 400 psig. A temperature rise to 720°F occurred in the reactor and cooling air was passed over the reactor. Attempts were made to line out the reactor at an ethylene flow rate of 35 liters per hour and an n-heptane pumping rate of 2 ml per minute. However, after a short period of time the flow was stopped as the reactor had plugged and the reactor was shut down.

The reactor when opened, showed that it had plugged by a product form which appeared to be almost a carbon black type product. It did not appear as heavy polymer, i.e., the resinous or liquid, but black, almost powdery-like material which had solid chunks indicating coke formation.

The above run demonstrates the necessity for the presence of the olefin disproportionation component when ethylene is contacted with with the dimerization component in order to obtain the desired higher olefins.

Reasonable variations and modifications are possible without departing from the spirit and scope of the invention.

I claim:

1. A method of converting ethylene to higher molecular weight product olefins comprising a reaction product mixture of olefins including propylene and other non-multiples of ethylene, which are present in the mixture in excess of one weight percent based on the total weight of the hydrocarbon in the product mixture, by contacting a feedstream consisting essentially of ethylene with a catalyst system which comprises A. nickel oxide and B. (1) silica or thoria promoted by an oxide or compound convertible to an oxide of tungsten or molybdenum; (2) alumina promoted by an oxide or compound convertible to an oxide by calcination of molybdenum, or tungsten, or promoted by an alkali metal salt, alkaline earth metal salt, or bismuth salt of phosphomolybdic acid; (3) one or more of the group aluminum phosphate, zirconium phosphate, calcium phosphate, magnesium phosphate, or titanium phosphate promoted by one or more of an oxide or compound convertible to an oxide by calcination of molybdenum or tungsten, or promoted by magnesium tungstate or beryllium phosphotungstate; or (4) silia, alumina, aluminum phosphate, zirconium phosphate, calcium phosphate, magnesium phosphate, or titanium phosphate promoted by rhenium oxide or by a hexacarbonyl of molybdenum, tungsten, or rhenium at a temperature in the range of 500° to 800°F.

2. A method according to claim 1 wherein (B) comprises silica promoted by an oxide of tungsten, alumina promoted by an oxide of molybdenum, aluminum phosphate promoted by an oxide of tungsten, alumina promoted by an oxide of rhenium or alumina promoted by a hexacarbonyl of molybdenum.

3. A method according to claim 1 wherein the conversion of ethylene is carried out at a pressure of 0–1,500 psig.

4. A method according to claim 1 wherein the catalyst is contacted with ethylene in the vapor phase at a temperature of about 700°F and a pressure of about 400 psig.

5. A method according to claim 1 wherein the catalyst system comprises (B) copromoted with nickel oxide.

6. A method according to claim 5 wherein (B) comprises silica, silica-alumina, or alumina promoted by molybdenum oxide, tungsten oxide, or rhenium oxide.

7. A method according to claim 5 wherein the catalyst system is silica copromoted by nickel oxide and tungsten oxide.

8. A method according to claim 1 wherein the catalyst system comprises a physical mixture supported nickel oxide and (B).

9. A method according to claim 8 wherein the proportion of (B) to supported nickel oxide in the catalyst mixture is in the range of about 0.1 to about 10 parts by weight.

10. A method according to claim 8 wherein the catalyst system comprises a physical mixture of tungsten oxide supported on silica and nickel oxide supported on silica-alumina, and nickel oxide supported on silica.

11. A method according to claim 8 wherein the nickel oxide is supported on silica, alumina, or silica-alumina.

* * * * *